June 13, 1967  O. B. CRUSE  3,324,771
FRICTION DEVICE OPERATING MECHANISM
Filed April 23, 1965  2 Sheets-Sheet 1

INVENTOR
OLIVER B. CRUSE
BY
Joseph E. Papin

June 13, 1967  O. B. CRUSE  3,324,771
FRICTION DEVICE OPERATING MECHANISM
Filed April 23, 1965  2 Sheets-Sheet 2

INVENTOR
OLIVER B. CRUSE
BY
Joseph E. Papin

United States Patent Office 3,324,771
Patented June 13, 1967

3,324,771
FRICTION DEVICE OPERATING MECHANISM
Oliver B. Cruse, Florissant, Mo., assignor to Wagner Electric Corporation, St. Louis, Mo., a corporation of Delaware
Filed Apr. 23, 1965, Ser. No. 450,485
5 Claims. (Cl. 92—24)

ABSTRACT OF THE DISCLOSURE

A spring set brake device divided into release and service braking chambers by a service braking actuator, and an emergency spring in the service chamber for mechanical driving engagement with the service braking actuator.

---

Figure 1:
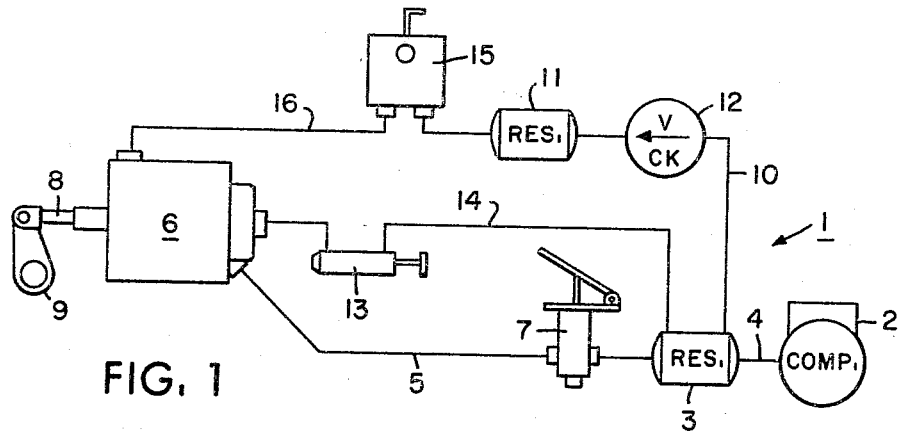

This invention relates to friction device operating mechanisms and in particular to those having emergency actuating means therein.

In the past, friction device operataing mechanisms were provided with emergency actuating means, such as a spring-loaded piston, responsive to failure of the vehicle fluid pressure system for mechanically energizing the vehicle friction device and effecting emergency vehicle stops. Since these emeregncy vehicle stops often occurred at unexpected and inopportune times placing the vehicle in a dangerous position with respect to other vehicles on the roadway, it was necessary to move said vehicle to a less dangerous position in order to correct the system failure, and to this end various manually operable emergency release mechanisms were provided to overcome the emergency function of the spring-loaded piston to mechanically de-energize said friction device. Of course, one of the undesirable or disadvantageous features of such past friction device operating mechanisms was that the emergency release mechanisms therefor were necessarily actuated only to a degree providing limited vehicle movement so that the vehicle friction devices were under drag conditions. In other words, if the emergency release mechanisms were actuated to completely overcome the emergency function of the spring-loaded piston, the vehicle would be uncontrollable due to the failure of the fluid pressure system thereof. Another undesirable or disadvantageous feature of such past friction device operating mechanisms was that the energization or de-energization of the vehicle friction device could not be controlled upon the actuation of the emergency release mechanisms due to the failure of the vehicle fluid pressure system. Still another undesirable or disadvantageous feature of such past friction device operating mechanisms was that the spring-loaded piston thereof could not be controllably displaced to effect controlled vehicle movement or deceleration. And still another undesirable or disadvantageous feature of such past friction device operating mechanisms was that the actuation of such emergency release mechanisms obviated controllable displacement of the spring-loaded piston for effecting further energization or de-energization of the vehicle friction devices.

The primary object of the present invention is to provide a friction device operating mechanism which overcomes the aforementioned undesirable features, and this and other objects and advantageous features of the present invention will become apparent hereinafter.

Briefly, the present invention embodies a friction device operating mechanism having actuation means defining an expansible fluid pressure chamber and responsive to fluid pressure applied to said chamber for energizing a friction device, and resiliently urged means in said chamber for driving engagement with said actuation means to mechanically energize said friction device, said actuation means also defining another expansible fluid pressure chamber opposed to said first named chamber and being responsive to other fluid pressure applied to said other chamber for urging said resiliently urged means to an inoperative position for releasable retention therein.

Figure 2:
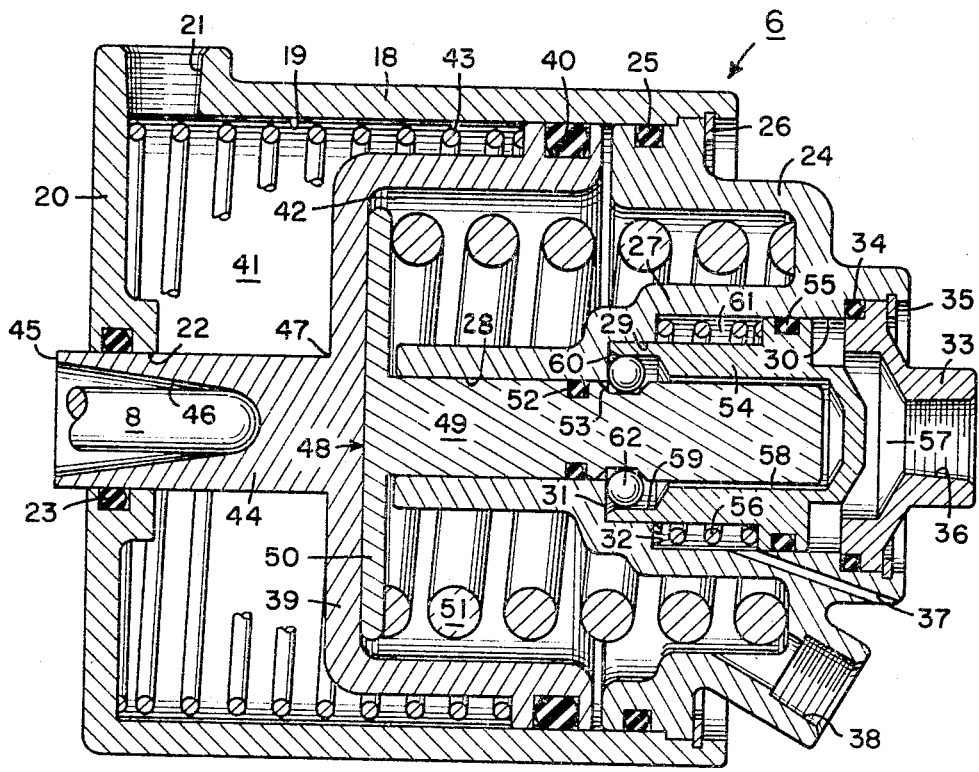
Figure 3:
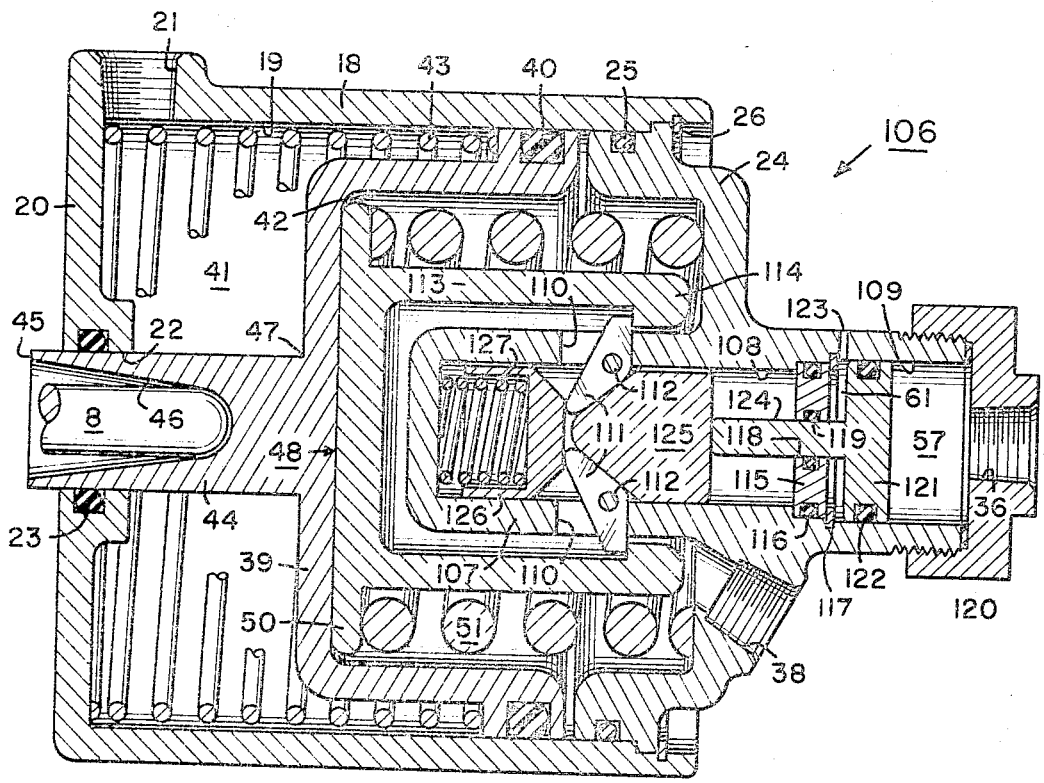

In the drawings which illustrate embodiments of the invention,

FIG. 1 is a diagrammatic view of a fluid pressure system showing a friction device operating mechanism embodying the present invention therein, and FIGS. 2 and 3 are sectional views showing embodiments of the friction device operating mechanism of FIG. 1 in cross-section.

Referring now to FIG. 1 in detail, a fluid pressure system 1 is shown having pressure generating means, such as a compressor 2, connected with a main or service reservoir 3 by a conduit 4, said compressor and main reservoir forming in combination a fluid pressure source. Another conduit 5 is connected between the main reservoir 3 and the modulating port of a friction device operating mechanism or actuating cylinder 6 having a modulating valve 7 of a type well known to the art interposed therein, said friction device operating mechanism being operatively connected by an actuating linkage 8 with a slack adjustor 9 or the like for controlling the energization of a friction device (not shown). Another conduit 10 is connected between the main reservoir 3 and a protected reservoir 11, and a uni-directional check or flow valve 12 is interposed in said conduit 10 to prevent reduction of fluid pressure in said protected reservoir due to a malfunctioning compressor or leaks or the like in the system 1 ahead of said uni-directional flow valve. A push-pull valve 13 of the type well known to the art is interposed in a conduit 14 which is connected between the control port of the actuating cylinder 6 and the main reservoir 3, said push-pull valve being movable between a connecting position providing pressure fluid communication between said main reservoir and said actuating cylinder control port and a venting position exhausting said actuating cylinder control port to the atmosphere. To complete the description of the system 1, another modulating valve 15 is interposed in a conduit 16 which is connected between the release port of the actuating cylinder 6 and the protected reservoir 11; and it should be noted that the modulating valves 7, 15 are movable between normal exhausting positions and actuated fluid pressure metering positions and may be either of the hand or foot application type, as desired, both of which are well known in the art.

The actuating cylinder 6, FIG. 2, is provided with a housing 18 having a bore 19 which is closed at the leftward end thereof by a radially extending wall 20, and a modulating or release port 21 which receives the conduit 16, as previously mentioned, intersects said housing bore adjacent the leftward end thereof, said wall being provided with a centrally located aperture or bore 22 therethrough in which is disposed an O-ring seal 23. The rightward end of the housing bore 19 is closed by a housing or closure member 24 having a peripheral seal 25 therein in sealing engagement with said housing bore, and a snap ring and groove assembly 26 is provided adjacent to the rightward end of said housing bore for displacement preventing engagement with said closure member. The closure member 24 is provided with an integrally formed hub or extension portion 27 which extends coaxially into the housing bore 19, and stepped bores 28, 29, 30 having radially extending shoulders 31, 32 therebetween are provided through said hub portion. An end cap 33 having a peripheral seal 34 engaged with the larger stepped bore 30 is retained against displacement from the rightward end of said larger stepped bore by another snap ring and groove assembly 35, and a control port 36 which receives the conduit 14, as previously mentioned, is provided through said end cap. A venting or atmospheric passage 37 is provided in the closure member 34 intersecting the larger stepped bore 30 adjacent to the mid-portion thereof, and another modulating or application port 38 which receives the conduit 5, as previously mentioned, is also provided in said closure member connecting with the housing bore 19.

An actuating member or piston 39 having a peripheral seal 40 therein is slidable in the housing bore 19 between the wall 20 and the closure member 24 defining therewith opposed, expansible fluid pressure release and modulating chambers 41, 42 which are in pressure fluid communication with the release and modulating ports 21, 38, respectively, and a return spring 43 of relatively light compressive force is interposed between said wall and the leftward face or side of said actuating piston. A piston extension 44 is slidable in the wall aperture 22 in sealing engagement with the seal 23 therein, said extension being provided with a free or working end 45 exteriorly of the housing 18 with a recess 46 therein for operative connection with the linkage 8, as previously mentioned, and an interior end connected at 47 with the actuating piston 39.

A retaining member or piston, indicated generally at 48, is provided with a rod or extension portion 49 slidable in the smaller stepped bore 28 of the closure member hub 27 having a radially extending retainer or abutment portion 50 on the leftward end thereof in the modulating chamber 42, and an emergency spring 51 is biased between said abutment portion and the closure member 24 urging said retaining member leftwardly in a friction device energizing direction toward driving engagement with the actuating piston 39 in opposition to fluid pressure expansion of the release chamber 41, said retaining member and spring defining resiliently urged means. A peripheral seal 52 is carried in the rod 49 adjacent the mid-portion thereof in sealing engagement with the smaller stepped bore 28 to seal the modulating chamber 42 from the intermediate and larger stepped bores 29, 30, and a peripheral groove 53 is provided in said rod between said seal 52 and the rightward or free end of said rod which is coaxial with said larger stepped bore.

A stepped control piston 54 is slidable in the intermediate and larger stepped bores 29, 30 of the closure member hub 27 having a peripheral seal 55 therein in sealing engagement with said larger stepped bore, and a return spring 56 of relatively light compressive force is biased between said control piston and the hub shoulder 32 urging said control piston toward the end cap 33. An expansible fluid pressure control chamber 57 is defined in the larger stepped bore 30 between the rightward side or face of the control piston 54 and the end cap 33 in open pressure fluid communication with the control port 36, and a blind bore and counterbore 58, 59 which coaxially receives the rod member 49 is axially provided through the leftward end of said control piston with a beveled surface 60 formed between said counterbore and said control piston leftward end. It should be noted that an expansible intermediate chamber 61 is defined in the intermediate and larger stepped bores 29, 30 between the rod member seal 52 and the control piston 54 in open pressure fluid communication with the venting passage 37 in the closure member 24 and in opposition to the control chamber 57. To complete the description of the actuating cylinder 6, a plurality of displaceable members or bearings 62 are provided for releasable bearing or locking engagement between the retaining member groove 53 and the hub shoulder 31, said counterbore 59 of the control piston 54 providing an abutment for engagement with said bearings to control the radial displacement thereof from said retaining member groove.

In the operation, assume that normal vehicle operating conditions exist wherein the main and protected reservoirs 3, 11 are charged with fluid pressure from the compressor 2. When the modulating valve 15 is actuated, fluid pressure is metered from the protected reservoir 11 through the conduit 16, said modulating valve, the release port 21 of the actuating cylinder 6 and into the release chamber 41. The fluid pressure so established in the release chamber 41 acts on the effective area of the actuating piston 39 therein to create a release force $F_1$ concertedly urging said actuating piston and the retaining member 48 rightwardly toward their respective inoperative positions (as shown in FIG. 2) against the compressive force $Fs$ of the emergency spring 51. The push-pull valve 13 is now moved to its connecting position providing pressure fluid flow from the main reservoir 3 through the conduit 14, said push-pull valve, and the control port 36 of the actuating cylinder 6 into the control chamber 57. The fluid pressure so established in the control chamber 57 acts on the effective area of the control piston 54 therein to create a holding or control force $Fc$ biasing said control piston against the return spring 56 until the leftward end thereof engages the hub shoulder 31 to position the control piston counterbore 59 in displacement preventing engagement with the bearings 62. In this manner, the bearings 62 are positively positioned in the retaining member groove 53 against displacement, and the locking engagement of said bearings between said groove and the hub shoulder 31 positively retains the retaining member 48 in its inoperative position. The modulating valve 15 is now moved to its normal or exhaust position to exhaust the fluid pressure in the release chamber 41 to atmosphere through the release port 21, the conduit 16 and said hand valve thereby eliminating the force $F_1$ acting on the actuating piston 39, and the return spring 43 serves to normally maintain said actuating piston in its inoperative position upon the elimination of the force $F_1$. As described above, the component parts of the system 1 and the actuating cylinder 6 are now positioned as shown in FIGS. 1 and 2.

If the operator desires to make a service application under normal operating conditions to energize the friction device and effect vehicle deceleration or a complete stop, the modulating valve 7 is actuated to meter fluid pressure from the main reservoir 3 through the conduit 5, said modulating valve, and the modulating port 38 of the actuating cylinder 6 into the modulating chamber 42. The fluid pressure so established in the modulating chamber 42 acts on the effective area of the actuating piston 39 therein creating an application or service force $F_2$ to move said actuating piston and the extension 44 leftwardly toward an operative position against the return spring 43 thereby actuating the extension working end 45 and the linkage 8 to rotate the slack adjustor 9 and energize the friction device (not shown) under normal operating conditions. Upon the attainment of the desired deceleration or complete stop, the modulating valve 7 is moved to its normal exhaust position to exhaust fluid pressure from the modulating chamber 42 to the atmosphere through the modulating port 38, the conduit 5 and said modulating valve thereby eliminating the force $F_2$, and the return spring 43 again returns the actuating piston 39 toward its inoperative position along with the component parts associated therewith to de-energize the friction device.

Under emergency operating conditions when the fluid pressure in the main reservoir 3 is reduced below a predetermined value or depleted due to a malfunctioning compressor or leaks in the system 1 or the like, the fluid pressure in the control chamber 57 of the actuating cylinder 6 is also reduced along with a corresponding reduction in the magnitude of the holding force $Fc$. Upon the reduction of the fluid pressure in the chamber 57 to a value less than the predetermined value, the compressive force of the control piston return spring 56 overcomes the reduced holding force Fc to move the control piston 54 rightwardly into abutment with the end cap 33 and thereby move the control piston counterbore 59 rightwardly out of positioning engagement with the bearings 62. With the control piston counterbore 59 displaced from positioning engagement with the bearings 62, the compressive force Fs of the emergency spring 51 overcomes the locking engagement of said bearings between the retaining member groove 53 and the hub shoulder 31 and moves the retaining member 48 leftwardly toward an operative or work-producing position. This resiliently urged movement of the retaining member 48 serves to displace the bearings 62 radially outwardly to a displaced position between the intermediate stepped bore 29 and the peripheral surface of the retaining member rod portion 49 and between the hub shoulder 31 and the control piston beveled surface 60. Since the actuating piston 39 is normally urged toward abutment with the retaining member 48, the resiliently urged leftward movement of the retaining member 48 concertedly drives said actuating piston leftwardly in the housing bore 19 toward its operative position against the return spring 43 to actuate the extension working end 45 and linkage 8 thereby rotating the slack adjustor 9 to effect mechanical energization of the friction device (not shown) under emergency operating conditions.

With the component parts of the system 1 and the actuating cylinder 6 positioned as described above under emergency operating conditions, the friction device is now mechanically energized to effect an emergency vehicle stop. Often such emergency vehicle stops occur at unexpected and inopportune times and place the vehicle in a dangerous position with regard to other vehicles on the roadway; therefore, upon the occurrence of such emergency stops, it is advantageous to move the vehicle to a less dangerous position in order to correct the failure of the system 1. Of course, it is highly desirable for the operator to have complete control over the energization and de-energization of the friction device when moving the vehicle to a less dangerous position subsequent to an emergency stop, and to this end the modulating valve 15 may be employed to controllably move the vehicle. Since the check valve 12 serves to maintain a reserve supply of fluid pressure in the protected reservoir 11 upon the depletion of the fluid pressure in the main reservoir 3, the operator may actuate the modulating valve 15 to meter fluid pressure into the actuating cylinder release chamber 41, as previously described, to controllably re-establish the force $F_1$ which acts on the actuating piston 39 in opposition to the compressive force Fs of the emergency spring 51 to controllably move said piston rightwardly toward the inoperative position thereof. In this manner, the force Fs of the spring 51 is overcome and the friction device can be controllably energized and de-energized to effect controlled movement of the vehicle to a more desirable or less dangerous position by modulating the fluid pressure in the release chamber 41 through the modulating valve 15.

When the fluid pressure failure of the system 1 has been corrected and the fluid pressure in the main reservoir 3 is increased to a value greater than the predetermined value wherein normal operating conditions are now reestablished, the fluid pressure in the actuating cylinder control chamber 57 is correspondingly increased to re-establish the magnitude of the holding force Fc and again urge the control piston 54 leftwardly against its return spring 56 to engage the beveled surface 60 thereon with the displaced bearings 62. In order to de-actuate the cylinder 6 and de-energize the friction device, the operator may again actuate the modulating valve 15 to meter fluid pressure into the actuating cylinder release chamber 41 and reestablish the force $F_1$ acting to urge the actuating piston 39 and retaining member 48 rightwardly toward their respective inoperative positions against the force Fs of the spring 51. This rightward movement of the retaining member 48 re-positions the groove 53 therein relative to the hub shoulder 31 to again receive the bearings 62; and at the same time, the re-established holding force Fc moves the control piston 54 leftwardly to again move the counterbore 59 thereof into positioning engagement with the bearings 62. In this manner, the bearings 62 are forced back to their original positions into the groove 53 in locking engagement with the hub shoulder 31 to maintain the retaining member 48 in its inoperative position against the force of the emergency spring 51, and upon the elimination of the force $F_1$, the actuating piston 39 is once again operative independently of the spring force Fs for normal service applications, as previously described.

Of course, the operator may simulate the emergency operating conditions if he so desires, for instance, for vehicle parking purposes, by "dynamiting" the system 1. To "dynamite" the system 1, the operator merely moves the push-pull valve 13 to the venting position thereof exhausting fluid pressure from the actuating cylinder control chamber 57 to the atmosphere through the control port 36, the conduit 14 and said push-pull valve thereby eliminating the holding force Fc and simulating the emergency operating conditions to initiate the emergency function of the actuating cylinder 6 and mechanically energize the friction device, as described hereinbefore.

Referring now to FIG. 3, another friction device operating mechanism or actuating cylinder 106 is shown having substantially the same component parts and functioning in the system 1 in substantially the same manner as the previously described actuating cylinder 6 with the following exceptions.

The actuating cylinder 106 is provided with a hub portion 107 integrally connected with the closure member 24 and having an axial bore and counterbore 108, 109 therein. Opposed radially extending slots 110 are provided through the hub 107 between the modulating chamber 42 and the hub bore 108, and opposed cam members 111 are rotatably mounted for pivotal displacement in said slots on pivot pins 112 retained in said hub. The retaining member 48 is provided with an annular extension 113 which is coaxial with the hub 107, and an annular flange 114 is provided on the free end of said extension for holding or locking engagement with the cams 111 when said retaining member is in the inoperative position thereof. A wall member 115 having a peripheral seal 116 engaged with the hub counterbore 109 is positioned in engagement with the shoulder formed between the hub bore and counterbore 108, 109 by a snap ring and groove assembly 117 positioned in said hub counterbore, and an aperture 118 is axially provided through said wall member having another seal 119 disposed therein. An end cap 120 which includes the control port 36 is threadedly received on the rightward or exterior end of the hub 107, and a control piston 121 having a peripheral seal 122 therein is slidably disposed in the hub counterbore 109 between the wall member 115 and said end cap. The control chamber 57 is defined in the hub counterbore 109 between the control piston 121 and the end cap 120, and the intermediate chamber 61 is also defined in said hub counterbore between said control piston and wall member 115, said intermediate chamber being vented to atmosphere by a vent passage 123 in said hub 107. A control piston extension 124 is slidable in the wall aperture 118 in sealing engagement with the seal 119 therein and has an end connected with the control piston 121 while the other or free end thereof extends into the hub bore 108 for engagement with an abutment member 125 which is slidable in the hub bore 108. The abutment member 125 is engaged with the cams 111 to control the pivotal displacement thereof about the pivot pins 112 into and out of holding engagement with the retainer member flange 114 in response to the holding force Fc acting on the control piston 121. To complete the description of the actuating cylinder 106, a cam positioning piston 126 is slidable in the hub bore 108 in opposition to the abutment member 125 and engaged with the cams 111, and a spring 127 urges the cam positioning piston 126 rightwardly in a direction to maintain said cams in engagement with the abutment member 125.

It is now apparent that novel friction device operating mechanisms 6 and 106 meeting the objects and advantages set out hereinbefore, as well as other objects and advantages apparent from the disclosure, are provided and that changes in the precise configuration, shapes or details of the construction set forth in the disclosure by way of illustration may be made by those skilled in the art without departing from the spirit of the invention, as defined by the claims which follow.

The embodiments of the invention in which an exclusive property or privilege is claimed are defined as follows:

1. A friction device operating mechanism comprising a housing having a pair of opposed fluid pressure chambers therein, piston means movable in said housing between said chambers and having a working end thereon, said piston means being movable in response to fluid pressure selectively established in one of said chambers toward an operative position in said housing to actuate said working end, a hub portion connected with said housing and extending into said one chamber, an abutment member in said one chamber including extension means thereon coaxial with said hub portion, spring means engaged with said abutment member and normally urging said abutment member from an inoperative position toward an operative position in driving engagement with said piston means to mechanically actuate said working end, said piston means also being movable in response to fluid pressure selectively established in the other of said chambers toward an inoperative position in said housing to engage and concertedly move said abutment member toward its inoperaive position against said spring means, displaceable means in said hub portion for releasable engagement with said extension means in the inoperative position of said abutment member to prevent movement thereof toward the operative position, and other means movable in said hub portion and defining therewith an expansible fluid pressure control chamber, said other means being responsive to fluid pressure in said control chamber to maintain said displaceable means in engagement with said extension means in the inoperative position of said abutment member.

2. A friction device operating mechanism comprising a housing having a housing bore therein, a pair of opposed expansible fluid pressure chambers in said housing bore, a piston slidable in said housing bore between said chambers and having a working end thereon, a pair of ports in said housing connecting with said chambers for selective connection with a fluid pressure source and the atmosphere, respectively, said piston being movable toward an operative position in said housing bore to actuate said working end in response to fluid pressure at one of said ports when the other of said ports is connected with the atmosphere, a hub portion connected with said housing and extending axially into one of said chambers, a pair of stepped bores in said hub portion, another piston slidable in the smaller of said stepped bores between operative and inoperative positions and having one end portion extending into the larger of said stepped bores and an opposed end portion extending into said one chamber, a spring retainer connected with the opposed end portion of said other piston, a spring biased between said housing and retainer normally urging said other piston toward its operative position into driving engagement with said first named piston to concertedly move said first named piston toward its operative position and mechanically actuate said working end, said first named piston also being movable toward an inoperative position in said housing bore in response to fluid pressure at said other port when said one port is connected with the atmosphere to engage and move said other piston toward its inoperative position against said spring, displaceable means in said larger stepped bore for releasable engagement with said one end portion of said other piston in the inoperative position thereof to prevent movement of said other piston toward its operative position and positively contain the compressive force of said spring between said retainer and housing, and a control piston slidable in said larger stepped bore and defining therewith an expansible fluid pressure control chamber, said control piston being urged in response to fluid pressure in said control chamber into displacement preventing engagement with said displaceable means to maintain the engegement thereof with said one end portion of said other piston in its inoperative position.

3. A friction device operating mechanism comprising a housing having extension means thereon, actuating means movable in said housing between operative and inoperative positions and defining therewith a pair of opposed fluid pressure chambers, resiliently urged means movable in one of said chambers between operative and inoperative positions including means extending into said housing extension means, said resiliently urged means being movable to mechanically drive said actuating means in concert toward their respective operative positions and being concertedly urged with said actuating means toward their respective inoperaive positions in response to fluid pressure selectively established in the other of said chambers, and other means in said housing extension means separated from said one chamber and urged in response to control fluid pressure supplied thereto in excess of a predetermined value into releasable retaining engagement with said included means to retain said resiliently urged means in its inoperative position and positively contain the force thereof, said actuating means being thereafter movable independently of said resiliently urged means toward its operative position in response to metered fluid pressure selectively established in said one chamber when said resiliently urged means is retained in its inoperative position.

4. A friction device operating mechanism comprising a housing having extension means thereon, actuating means movable in said housing between operative and inoperative positions and defining therewith a pair of opposed fluid pressure chambers, said actuating means being movable toward its operative position in response to fluid pressure selectively established in one of said chambers, resiliently urged means movable in said one chamber between operative and inoperative positions and including other extension means substantially coaxial with said housing extension means, said resiliently urged means being normally urged toward its operative position to engage and mechanically drive said actuating means toward its operative position and said actuating means also being movable toward its inoperative position in response to fluid pressure selectively established in the other of said chambers to concertedly drive said resiliently urged means toward its inoperative position, displaceable means in said housing extension means for releasable engagement with said other extension means in the inoperative position of said resiliently urged means to prevent movement thereof toward its operative position, and other means movable in said housing extension means and defining therewith an expansible fluid pressure control chamber, said other means being responsive to fluid pressure in said control chamber to maintain said displaceable means in engagement with said other extension means in the inoperative position of said resiliently urged means.

5. A friction device operating mechanism comprising a housing having extension means thereon, actuating means movable in said housing between operative and inoperative positions and defining therewith a pair of opposed fluid pressure chambers, resiliently urged means movable in one of said chambers between operative and inoperative positions including other extension means substantially coaxial with said housing extension means, said resiliently urged means being movable to mechanically drive said actuating means in concert toward their respective operative positions and being concertedly urged with said actuating means toward their respective inoperative positions in response to fluid pressure selectively established in the other of said chambers, displaceable means in said housing extension means for releasable retaining engagement with said other extension means when said resiliently urged means is in its inoperative position, other means movable in said housing extension and defining therewith an expansible fluid pressure control chamber, means within said housing extension including said other means defining an atmospheric chamber between said control chamber and said one chamber, and positioning means connected with said other means for engagement with said displaceable means, said other means being movable in response to fluid pressure in said control chamber to engage said positioning means with said displaceable means and urge said displaceable means into releasable retaining engagement with said other extension means to positively retain said resiliently urged means in its inoperative position containing the force thereof, and said actuating means being thereafter movable independently of said resiliently urged means toward its operative position in response to fluid pressure selectively established in said one chamber.

References Cited

UNITED STATES PATENTS

| | | | |
|---|---|---|---|
| 2,573,384 | 10/1951 | Bent | 92—130 |
| 2,773,485 | 12/1956 | Geyer | 92—17 |
| 3,175,473 | 3/1965 | Boteler et al. | 92—130 |
| 3,182,566 | 5/1965 | Berg et al. | 92—24 |
| 3,183,791 | 5/1965 | Cruse | 92—24 |
| 3,260,168 | 7/1966 | Cruse | 92—24 |
| 3,282,169 | 11/1966 | Leighton | 92—24 |

MARTIN P. SCHWADRON, *Primary Examiner.*

I. C. COHEN, *Assistant Examiner.*